United States Patent
Godas-Lopez

(10) Patent No.: US 10,558,808 B2
(45) Date of Patent: Feb. 11, 2020

(54) METHODS AND APPARATUS FOR PACKET-BASED VALIDATION OF CONTROL-FLOW TRANSFERS FOR HARDWARE CONTROL-FLOW ENFORCEMENT

(71) Applicant: QUALCOMM Incorporated, San Diego, CA (US)

(72) Inventor: Daniel Godas-Lopez, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 113 days.

(21) Appl. No.: 15/060,274

(22) Filed: Mar. 3, 2016

(65) Prior Publication Data

US 2017/0255781 A1 Sep. 7, 2017

(51) Int. Cl.
*G06F 21/57* (2013.01)
*G06F 21/52* (2013.01)

(52) U.S. Cl.
CPC ............ *G06F 21/577* (2013.01); *G06F 21/52* (2013.01); *G06F 2221/033* (2013.01)

(58) Field of Classification Search
CPC .................................................. G06F 21/577
USPC .......................................................... 726/25
See application file for complete search history.

(56) References Cited

U.S. PATENT DOCUMENTS

| | | | |
|---|---|---|---|
| 6,606,315 B1 * | 8/2003 | Albert | H04L 45/00 370/352 |
| 6,889,260 B1 * | 5/2005 | Hughes | G06F 17/30569 707/E17.006 |
| 7,693,185 B1 * | 4/2010 | Brown | G06F 21/6209 370/474 |
| 8,127,121 B2 | 2/2012 | Yates et al. | |
| 8,724,479 B1 * | 5/2014 | Aybay | H04L 49/1515 370/242 |
| 9,912,591 B1 * | 3/2018 | Stark | H04L 45/745 |
| 2002/0152209 A1 * | 10/2002 | Merugu | H04L 47/10 |
| 2006/0161978 A1 * | 7/2006 | Abadi | G06F 21/52 726/22 |

(Continued)

OTHER PUBLICATIONS

International Search Report and Written Opinion—PCT/US2017/019199—ISA/EPO—dated May 9, 2017.
Rodriguez F., et al., A Watchdog Processor Architecture with Minimal Performance Overhead, Network and Parallel Computing, Jan. 2002, Springer International Publishing, vol. 2434, pp. 261-272, XP055367912.

(Continued)

*Primary Examiner* — Peter C Shaw
(74) *Attorney, Agent, or Firm* — Loza & Loza, LLP

(57) ABSTRACT

Disclosed are methods and apparatus for packet based validation of control flow transfers for hardware control-flow enforcement. The methods and apparatus achieve control-flow validation through the determination of a first identifier for a source packet that implements a jump, where the determination is based on a computation using contents within the source packet itself. Similarly, a second identifier is determined for a target packet to which the source packet is directed based on a computation using contents of the target packet. The identifiers may be predetermined based on the packet contents, and may also involve insertion of No Operation instructions to ensure the computations based on the packet contents yield the desired identifiers. The identifiers may then be compared to determine whether they match or are compatible, and an invalid control flow can be detected if they are not compatible.

38 Claims, 6 Drawing Sheets

(56) References Cited

U.S. PATENT DOCUMENTS

| | | | | |
|---|---|---|---|---|
| 2009/0010157 | A1* | 1/2009 | Holmes | H04L 47/10 370/230.1 |
| 2009/0022053 | A1* | 1/2009 | Aimoto | H04L 45/00 370/230 |
| 2013/0024676 | A1* | 1/2013 | Glew | G06F 9/30076 712/244 |
| 2013/0031337 | A1 | 1/2013 | Larin et al. | |
| 2013/0283245 | A1* | 10/2013 | Black | G06F 8/433 717/130 |
| 2014/0241368 | A1* | 8/2014 | Suzuki | H04L 12/66 370/392 |
| 2015/0135313 | A1 | 5/2015 | Wesie et al. | |
| 2015/0172174 | A1* | 6/2015 | Kojima | H04L 47/2483 370/392 |

OTHER PUBLICATIONS

Rodriguez F., et al., "Improving the interleaved signature instruction stream technique," CCECE 2003, Canadian Conference on Electrical and Computer Engineering: Toward a Caring and Humane Technology, IEEE, vol. 1, May 2003, pp. 93-96, XP010653921.

Werner M., "Control-Flow Integrity: Compiler Assisted Signature Monitoring," May 31, 2014, pp. 1-70, XP055367632, Retrieved from the Internet: URL:https://online.tugraz.aVtug_online/voe_main2.getvolltext?pCurrPk=79538 [retrieved on Apr. 26, 2017].

Bletsch T., et al., "Mitigating Code-Reuse Attacks with Control-Flow Locking," Twenty-Seventh Annual Computer Security Applications Conference (ACSAC), 2011, pp. 353-362.

\* cited by examiner

METHODS AND APPARATUS FOR PACKET-BASED VALIDATION OF CONTROL-FLOW TRANSFERS FOR HARDWARE CONTROL-FLOW ENFORCEMENT

BACKGROUND

Field

The present disclosure relates generally to validation of control-flow transfers, and more specifically to methods and apparatus for packet-based validation of control-flow transfers for hardware control-flow enforcement.

Background

Computers are frequently targeted by malicious attackers who wish to gain control or manipulate software behavior. One way attackers can gain control of software is by exploiting software flaws or errors. For example, software implementation errors such as missing or incorrect input validation lead to overflow or out-of-bounds buffer accesses and memory corruption. Under normal conditions, these errors cause the software to become unstable and eventually crash. When an input is manipulated by a malicious attacker, however, these overflow bugs or memory corruptions can be exploited to change the expected behavior of the code and execute codes or functionalities determined by the attacker. A way that an attacker then typically gains control of execution is by overwriting a data structure in memory, such as a return address, a function pointer, or a virtual-table pointer.

Finding and fixing all exploitable memory-corruption bugs in large and legacy code-bases is not always possible. Therefore, most systems contain general defensive features, called "exploit mitigation mechanisms," that are effective against well-known techniques attackers use to exploit these bugs to gain control of the targeted systems.

Existing techniques for preventing exploitation of these vulnerabilities include Data Execution Prevention (DEP), Stack Protection (SP) and Address Space Layout Randomization (ASLR). There are also schemes that obfuscate sensitive pointers in software using macros or function calls (glibc and Win32). This prevents easily replacing these pointers or exposing their values. Obfuscation with a simple XOR function is the best that can be done in software because of performance concerns. Furthermore, with encryption or obfuscation, it is very hard to verify the decrypted value.

Accordingly, a need exists for an easier way for validating control flow carried out by a processor in order to more efficiently prevent exploitation of software flaws or errors by attackers.

SUMMARY

According to an aspect, the present disclosure provides a method for control-flow validation. The method includes determining a first identifier for a source packet based on a computation using contents of the source packet itself. Further, the method includes determining a second identifier for a target packet to which the source packet is directed based on a computation using contents of the target packet. The first identifier and the second identifier are compared and a determination is made that an invalid control flow exists when the first and second identifiers are determined to not be compatible based on the comparison of the two identifiers.

In another aspect of the present disclosure, an apparatus for control-flow validation is disclosed. The apparatus includes means for determining a first identifier for a source packet based on a computation using contents of the source packet. Additionally, the apparatus includes means for determining a second identifier for a target packet to which the source packet is directed based on a computation using contents of the target packet. Further, the apparatus includes means for comparing the first identifier and the second identifier and determining an invalid control flow when the first and second identifiers are determined by comparing to not be compatible.

In still another aspect, an apparatus for control-flow validation is disclosed. The apparatus includes processing circuitry configured for determining a first identifier for a source packet based on a computation using contents of the source packet. Additionally, the processing circuitry is configured for determining a second identifier for a target packet to which the source packet is directed based on a computation using contents of the target packet. Moreover, the processing circuitry is configured for comparing the first identifier and the second identifier and determining an invalid control flow when the first and second identifiers are determined from comparing to not be compatible.

In yet another aspect, the present disclosure provides a processor-readable storage medium having one or more instructions which, when executed by at least one processing circuit, cause the at least one processing circuit to determine a first identifier for a source packet based on a computation using contents of the source packet. The one or more instructions also a configured to cause the processing circuit to determine a second identifier for a target packet to which the source packet is directed based on a computation using contents of the target packet. The instructions also cause the processing circuit to compare the first identifier and the second identifier and determining an invalid control flow when the first and second identifiers are determined from comparing to not be compatible.

DETAILED DESCRIPTION

The present disclosure provides methods and apparatus for more efficiently providing control flow validation in order to thwart attacks on software execution and ensure that only intended control flow is executed. It is noted here at the outset, that the word "exemplary" is used herein to mean "serving as an example, instance, or illustration." Any example or aspect described herein as "exemplary" is not necessarily to be construed as preferred or advantageous over other examples or aspects.

Figure 1:
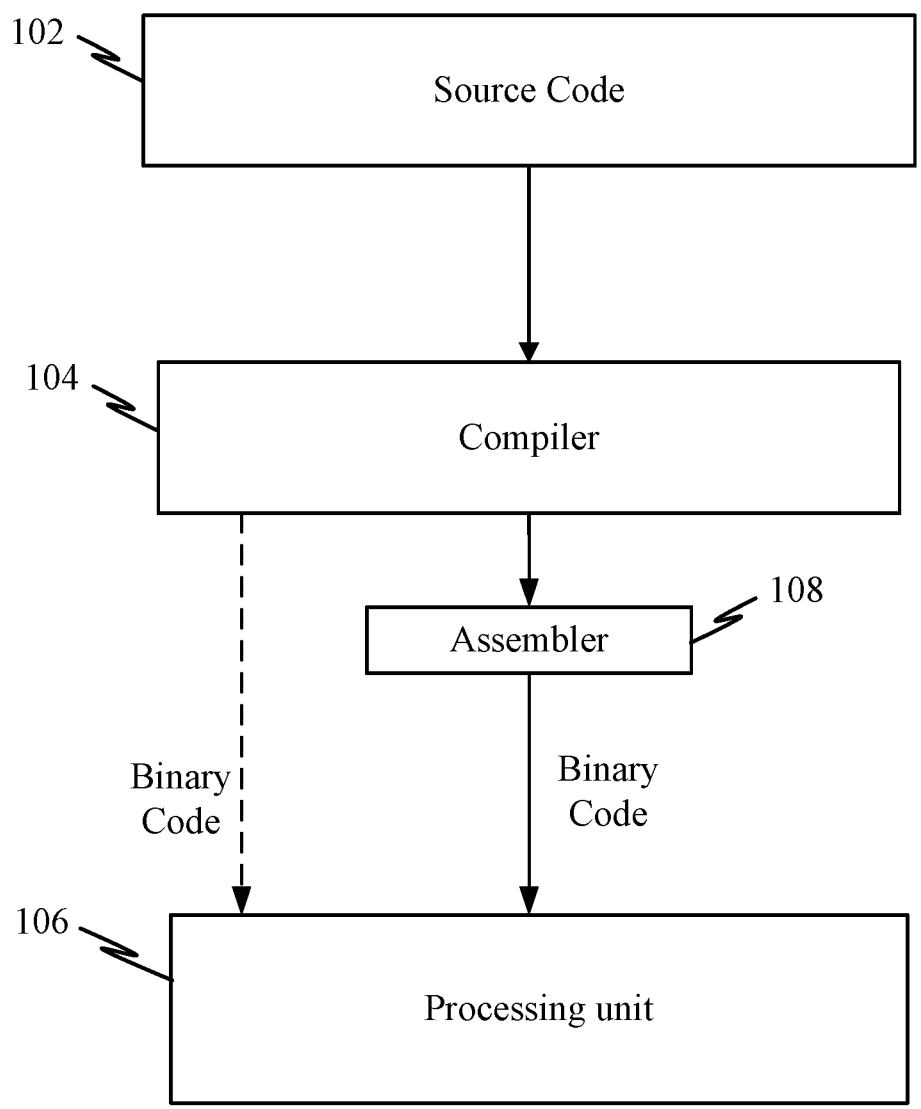
FIG. 1 is an exemplary diagram of interaction of software and hardware in a computer system utilizing the presently disclosed methods and apparatus.

As background, FIG. 1 illustrates an exemplary diagram of interaction of software (i.e., instructions) and hardware in a computer system. The software or source code 102, which may be stored in a memory device (not shown), is typically compiled by a compiler 104, which takes the source code and converts the source code either directly to a binary code that is executable by a processing unit 106 (indicated by the dashed arrow between compiler 104 and processing unit 106), or more typically into an assembly language or code. In the latter case, the assembly language generated by the compiler 104 is assembled by an assembler 108 into the binary code executable by the processing unit 106.

Another concept concerning the interface of software and hardware is Instruction Set Architecture (ISA), which serves as the boundary or interface between software and hardware (e.g., processing unit 106 or similar processor or controller). An ISA typically includes, among other things, instruction sets, native commands and data types, registers, addressing, interrupt and exception handing, and external input/output. Additionally, an ISA includes a specification of the set of operation codes or machine language, and the native commands implemented by a particular processor or controller. Furthermore, some ISAs implement the concept of instruction packets, where a packet is a group of instructions that are executed in parallel by the hardware. One example of an ISA using instruction packets is the Hexagon architecture developed by Qualcomm, and examples herein are applicable to this ISA for illustration purposes. Nonetheless, the concepts disclosed herein, however, may be applied to any instruction set architecture that implements packets or similar concepts.

As is known in the art, machine language is constructed with discrete statements or instructions, and these instructions may specify numerous locations or operations such as particular registers for arithmetic, addressing, and control functions, memory locations or offsets, and addressing modes used to interpret inputs or operands. These instructions may also be executed sequentially in a simple example, or may also be executed in a manner or order as directed by control flow instructions in more complex operations.

Operations or instructions that are common to many ISA's, including Hexagon, include: (1) data handling and memory operations or instructions (e.g., setting registers to values, reading and writing data to and from hardware devices, copying data from a memory to a register or writing data from a register to a memory, etc.); (2) arithmetic and logic operations or instructions (e.g., add, subtract, multiply, dividing values of two registers, shifting registers, etc.); and (3) control flow operations (e.g., branching or jumping to another location in a program, conditionally jumping if a particular condition is met, indirect jumping to another location (i.e., calling a block of code as well as saving a location of the next instruction as a return point to which the program will return, etc.). Furthermore, in ISAs implementing the packet concept, multiple instructions are contained within a packet. As an example from Hexagon, a packet with four (4) instructions, for example, could be constructed as follows:

```
{ r8 = asl(r8, r2)
  r4 = add(r7, r4)
  r5 = add(r7, r5)
  r6 = add(r7, r6) }
```

In the above instruction packet, the first instruction initiates performance of an arithmetic shift to the left of register 8 by an offset defined by register 2 and the result is placed in register 8, the second instruction is the addition operation of the contents of register 7 and register 4, which is then placed in register 4, the third instruction is the addition operation of the contents of register 7 and register 5, which is then placed in register 5, and so forth.

It is further noted that most ISA's also implement a No Operation (NOP) instruction that performs no operation, and is configured to ensure no alternation or change of a state of any of the programmer-accessible registers, status flags, or memory. A NOP instruction may be used to accomplish a number of different purposes, such as timing, forcing memory alignments, preventing hazards, occupying branch delay slots, voiding existing instructions such as a jump, or to place-hold in order to be replaced by active instructions later on in a program. The NOP instruction in Hexagon, for example may be defined as follows, where each character represents 1 bit:

0111 1 111 - - - - - - - - PP - - - - - - - - - - - - - -

The bits marked with the dashes "-" in the illustrated NOP represent undefined bits, which in the case of a Hexagon NOP number 22 undefined bits, and the PP bits indicate position information of the instruction in a packet. Additionally, it is noted that although some instructions may have a fixed position in an instruction packet, the NOP instruction for Hexagon does not have a fixed position and can be placed anywhere among the four instruction positions in the packet.

In order to provide validation of control flow, such as validating jumps, the presently disclosed methods and apparatus utilize a new quasi NOP type of instruction (which will be simply designated as a NOP instruction from now onwards) having a number of "free" bits (F) that can be set to any value without altering the behavior of the instruction or instruction packet. Furthermore, the presently disclosed methods and apparatus employ a number of hardware changes, which will be discussed in further detail later, where the hardware changes are configured to ensure that the hardware utilizes the new NOP instruction for at least the purpose of validation of control flow.

Concerning the construction of the NOP instruction, this instruction may be encoded just like a normal NOP known in the pertinent ISA. In the case of Hexagon, for example, the NOP instruction could be encoded like a standard Hexagon NOP and would have the 22 undefined bits designated as the free bits (F) mentioned above, although those skilled in the art will appreciate that other way of encoding the instruction could also be utilized. In an aspect, the free bits could be designated with a predefined value. In a further aspect, the free bits may be determined or calculated based on the instructions within an instruction packet (and more particularly a control transfer packet with one or more control flow instructions such as a jump or an indirect control transfer packet). In one example, the bits from all instructions in a control-transfer packet are combined into a single F-bit value using a predefined combination function. The computed F-bit value could then be designated as a signature or an identifier (ID), and more particularly as a source ID (SID) for the control transfer packet or a target ID (TID) for the destination packet It is noted here that the use of the NOP instruction may be applied to any packets, and particularly to indirect control transfer packets. Indirect control transfer packets include at least one indirect control flow transfer instruction, as mentioned before. This could be, for example, a jump to a register, a call to a register, or a return. The second packet in the following Hexagon packet sequence is an example of an indirect control-transfer packet:

```
{ immext(#3250070336)
  r0 = memw(##3250070380) }
{ jumpr r0 }
```

The first instruction packet provides for loading the contents of a memory location into a register (register 0). The second packet includes a jump to that register; i.e., register 0. It is noted that if an attacker took control of the memory location (i.e., location ##3250070380), for example, they could change the value of r0 to some arbitrary constant and take control of the execution.

Accordingly, the IDs computed using the bits in a the source and target packets can be used at run time to determine if the jump is valid or not by determining if the source ID (SID) and the target ID (TID) are compatible. It is further noted in an aspect, if the jump in an indirect control flow instruction is to a packet, such as the packet shown previously with the non-jump instructions (asl, add), this target packet may also include the same signature (e.g., SID) as the calling packet and therefore an equality check would be enough to determine its validity. Thus, if an attacker tries to take control of a register, such as register r0 in the packet above, the attacker will be thwarted as the signature of the calling and target packets do not match. Further, since the signature is encoded in the executable code, the attacker cannot gain control over the jump.

Figure 2:
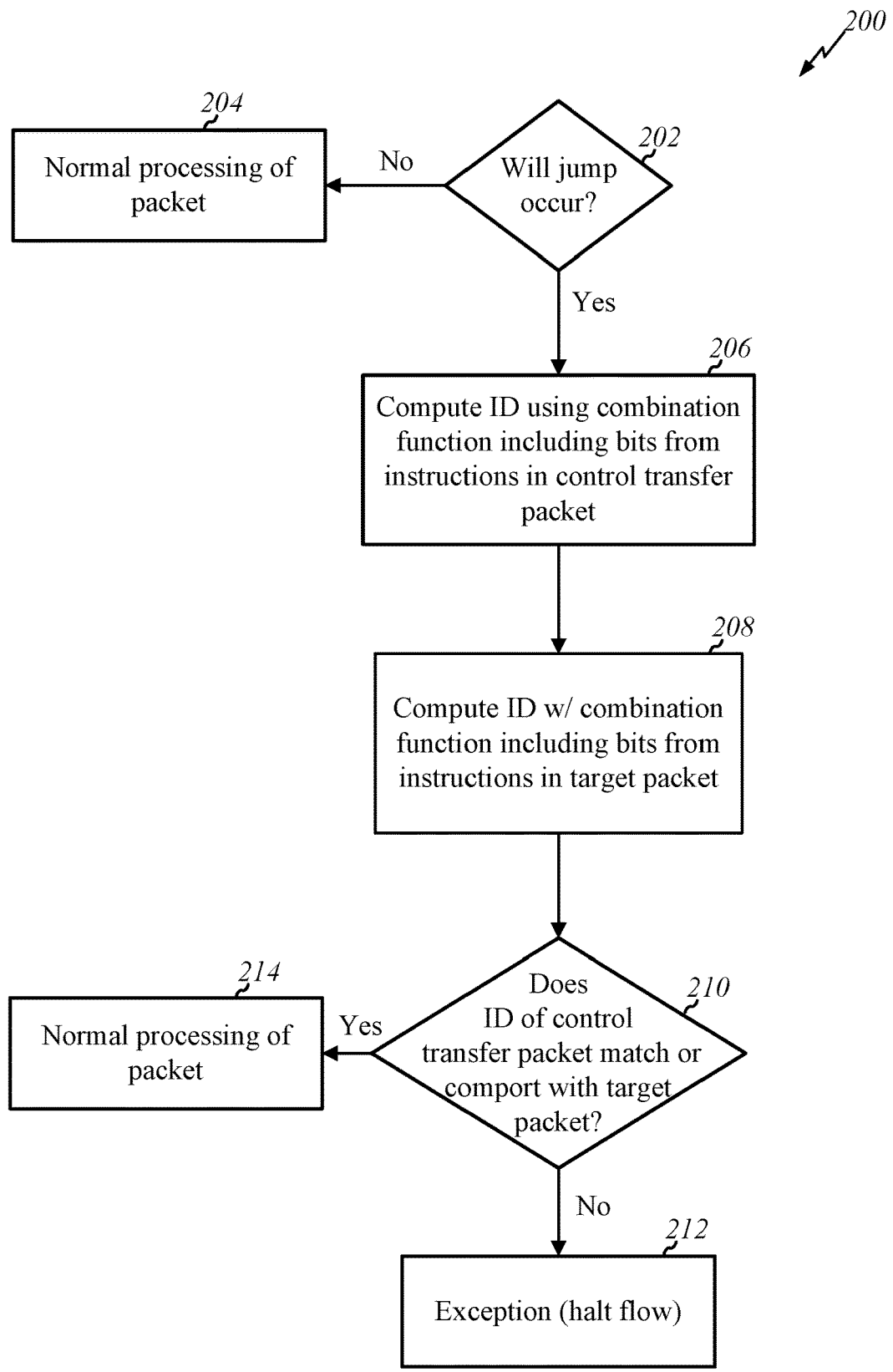
FIG. 2 illustrates an exemplary method for control flow validation according to the present disclosure.

FIG. 2 illustrates an exemplary method 200 for control flow validation according to the present disclosure. In an aspect, method 200 may be utilized when executing a control-transfer packet and is operable with a processor, microprocessor, controller, microcontroller, application specific processor, digital signal processor, or other processing devices.

Method 200 includes a decision block 202 where a processing unit evaluates a control transfer packet or indirect control transfer packet to determine whether or not a jump will take place, such as the jump in the indirect control-transfer packet discussed above, for example. If a jump will not happen, flow proceeds to block 204 where the packet is processed according to normal processing operations. Alternatively, if a jump will occur, flow proceeds to block 206 where a signature for the control transfer packet is determined (i.e., the SID). In an aspect, the process of block 206 includes using a combination function including bits from instructions in the control transfer packet. Thus, the function could include combining bits from at least some of the instructions in the packet, or even from all of the instructions in the particular control-transfer packet into a single value having a predetermined number of bits. In one example, this value may be represented with a single F-bit value of an F number of free bits (equivalent to having a combination function that directly returns this value and ignores all other bits in the packet). In yet a further aspect, the number of free bits is 22 bits as known in a particular ISA such as Hexagon. The free bits also may be in a NOP, as discussed earlier.

It is noted that the signature or ID value may be predetermined according to design. In still another aspect, when the bits of a control-transfer packet are combined to determine the SID, the combination of bits may be accomplished using a predetermined combination function. In one example pertaining to Hexagon, the combination function includes determining bits 0 to 13 of the SID through an XOR operation of all bits in the corresponding bit positions for each instruction in the packet. In a further aspect, the same XOR function may also be applied for bits 18 to 23. This particular combination function generates a 22-bit SID. It is noted, however, that this functionality is applicable to other ISAs and the combination of bits may be more or less yielding an SID having more or less than 22 bits. It is also noted that the combination functions for the control-transfer and target packets might or might not be the same.

According to yet another aspect, the target packet of a jump may include the SID of the control-transfer packet or some compatible ID value, so that upon comparison of the two IDs at runtime, the computed target ID (TID) is determined to be compatible. In the case of a compatible TID value, the matching to determine compatibility may include division operations having a remainder of 0 (e.g., the TID is a multiple of the SID).

Referring back to FIG. 2, after computation of the signature or SID in block 206, flow proceeds to processing block 208. At block 208, the TID is computed for the packet that is the target of the control-flow transfer. This computation may be accomplished with the combination function, which includes combining bits from instructions in the target packet. After computation of the TID in block 208, flow proceeds to decision block 210.

At block 210, a determination is made whether a match or verification of the SID of the control-transfer packet and the TID of the target packet match, verify (i.e. that the target is the correct jump destination), or comport. In an aspect, this process may be effectuated using a predefined verification function, where the function returns a Boolean value (i.e., True of False, 0 or 1, etc.). If the verification function yields a Boolean value equal to "True", this indicates that the target packet is the correct jump or control flow, and the code continues normal execution as shown by block 214. If the verification function returns a "False", then an exception is raised to signal a bad control transfer and the execution can be halted to prevent an attacker from taking control of the program.

In an example pertaining to Hexagon, the Verification Function may include determining if the first instruction in the target packet is not a NOP, which indicates that the target packet does not have a correct signature as determined in accordance with the presently disclosed method. If not, then the function returns a False (an exception). Additionally, if the SID of the control-transfer packet does not match or is not divisible by the value defined by the 22 free bits in the first instruction of the target packet (a NOP) the function also returns a False or mismatch indicating an exception (in this the 22 free bits would be interpreted as the TID). In such cases, the control flow is halted as indicated at block 212. In an aspect, if the processing unit finds no match, the raised exception may be configured to indicate to software that something is wrong, and that the routine to be killed or otherwise handled by the operating system (e.g., the BIOS). If the TID and the SID match, the function returns "True" or affirmative and processing proceeds normally as indicated at block 214.

According to a further aspect, the new NOP instruction can also be used to adjust the ID for every control-transfer and target packet so that expected control transfers are allowed and an exception is raised when incorrect control transfers are attempted. Since the ID can be chosen to be F bits long and the NOP instruction has F free bits, the Combination Function can be chosen so that an arbitrary value can be assigned to the ID by adding a single NOP instruction. If maximum packet lengths apply, the original packet can be split into two and then NOPs are added to one or both packets to adjust the IDs. For example, suppose a Hexagon control-transfer packet contains 4 instructions. If the SID for the packet is in some way unsatisfactory or not desired, a NOP cannot be simply added to modify it because the maximum number of instructions in a Hexagon packet is four (4). Nonetheless, one of the four (4) instructions can be split into a different packet resulting in one single or unitary (1) instruction packet and another instruction packet with three (3) instructions. A NOP may then be added to the packet that contains the indirect jump to adjust its SID.

In another aspect, it is noted that NOP instructions in source packets may be placed such that the NOP is not the first instruction in the packet. This placement serves to better avoid unauthorized jumps (i.e., one exemplary Verification Function returns False if the target packet doesn't begin with a NOP). In a further aspect, when division is used as the Verification Function, the SIDs (and their corresponding target NOPs) can be set to prime numbers whenever possible in order to better avoid clashes; i.e., unauthorized jumps.

Additionally, when division is used as the Verification Function, if there are two indirect calls to any given target, according to an aspect one of the SIDs of the sources can be reassigned to be a multiple of the other one. This allows for both calls to happen at the expense of allowing some unauthorized jumps (from the second caller to other targets of the first caller). A similar process can be applied several times in the case of multiple callers. A given architecture might allow for additional optimizations. For example, in the case of multiple callers to a given target, a new packet that only contains a NOP could be inserted right before the target and make or force one of the callers use this new packet as its target. In practice, this would not generate any unauthorized jumps at the expense of adding one more instruction per caller to the text section of the binary.

Figure 3:
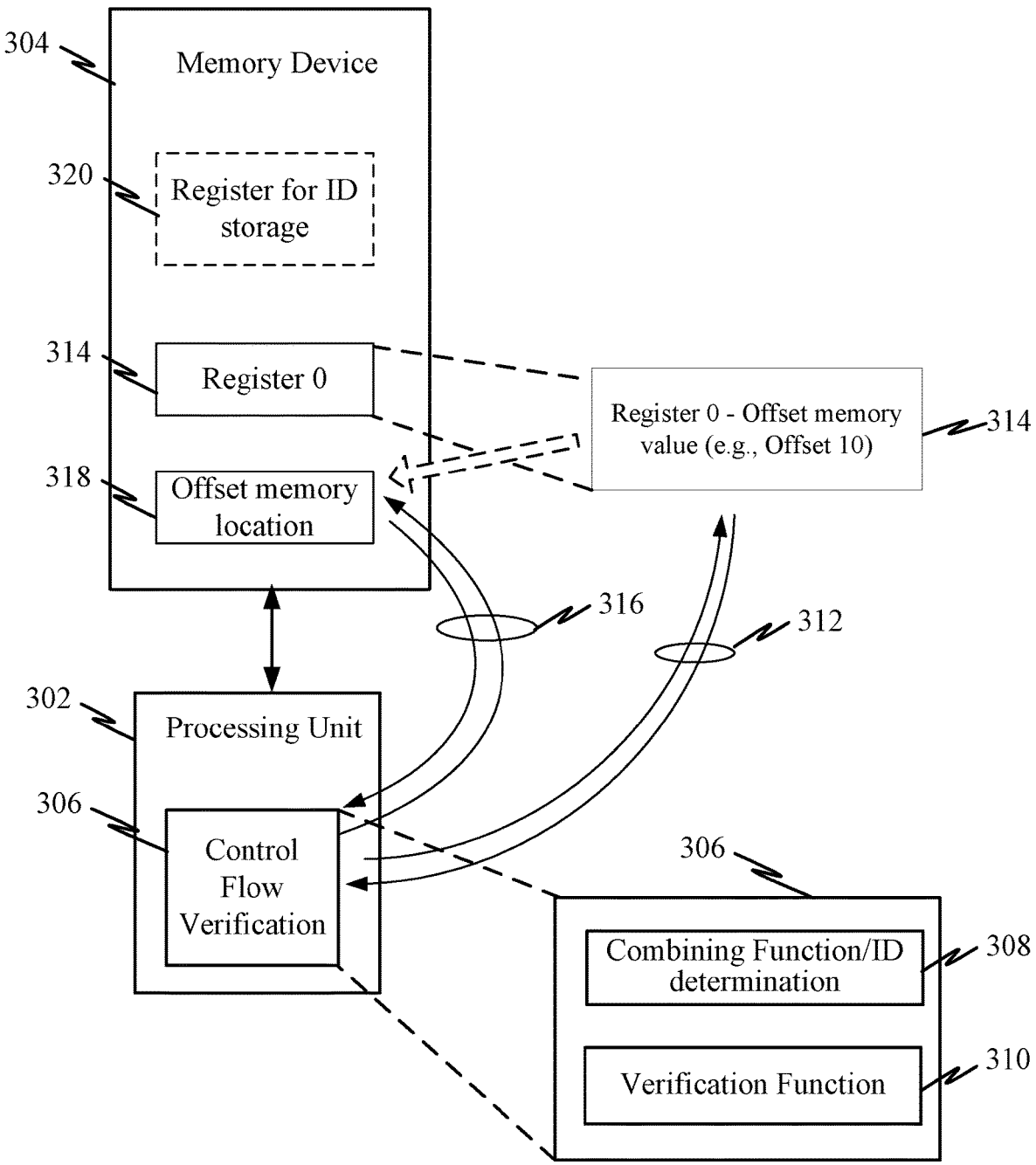
FIG. 3 is a block diagram illustrating an exemplary system configured to implement the methodology for validating control flow.

FIG. 3 is a block diagram illustrating an exemplary system 300 configured to implement the methodology for validating control flow. The system 300 includes a processing unit 302 or comparable processing circuitry or logic that is configured to implement the method of FIG. 2, for example. The processing unit 302 may be coupled to a separate or integrated memory device 304. Further, the processing unit 302 includes a logic portion or circuitry 306 configured for control flow verification as indicated by control flow verification portion 306 in processing unit 302.

Logic portion 306 includes a combining function or ID determination portion 308, which is configured to determine the ID or signature for a particular source control flow packet, but may also determine the ID for a target packet of the control flow packet. The functionality of portion 308 may include the combining function discussed before in connection with FIG. 2. Additionally, the control flow verification logic portion 306 may include a verification function 310 for verifying matching or compatibility between IDs of source and target packets.

In particular, the combining function 308 may be used at build time to combine the bits from each of the instructions in a source control flow packet to determine the SID, which is then used to compute a compatible TID. This TID may in turn be placed in a NOP as the first instruction in the target packet such that the control flow is deemed correct when the TID is compared with the SID, as determined with verification function logic 310, for example.

In a particular runtime example with reference to the indirect control flow packet discussed earlier, the register r0, for example, will contain a number that is an offset in memory. When there is a jump instruction in the source packet (e.g., " . . . {jumpr r0 . . . "), the processing unit (e.g., unit 302) takes the Source Packet and combines the bits therein in a predetermined manner to generate the source ID, such as through the operation of combining function logic 308. The processing unit 302 may then read the value in r0 (illustrated with the read 312 from register 314, which may be within memory device 304 as illustrated, but could also be separate from memory device 304 or part of the processing unit 302), and look up the target packet in memory (e.g., memory device 304). As example, if the value in register r0 (314) is 10, the program would go to offset 10 in memory (shown as memory location 318 in memory 304 as one example), read the target packet at that memory location as indicated by read 316, and then combine the bits in that target packet to get a new ID using the combination function 308, as one example. Accordingly, there would be two IDs or signatures that will be compared with one another to determine matching or some other compatibility; i.e., there would be the first ID for the source packet and a second ID for the target packet. The target ID (TID) would then be computed from the target packet and compared to the stored SID. It is noted that the hardware could have one or more hidden registers (i.e., not accessible through the instruction set) to temporarily store the IDs. As an example, memory device 304 may include a register 320 to store the SID that is not accessible through the instruction set.

Figure 4:
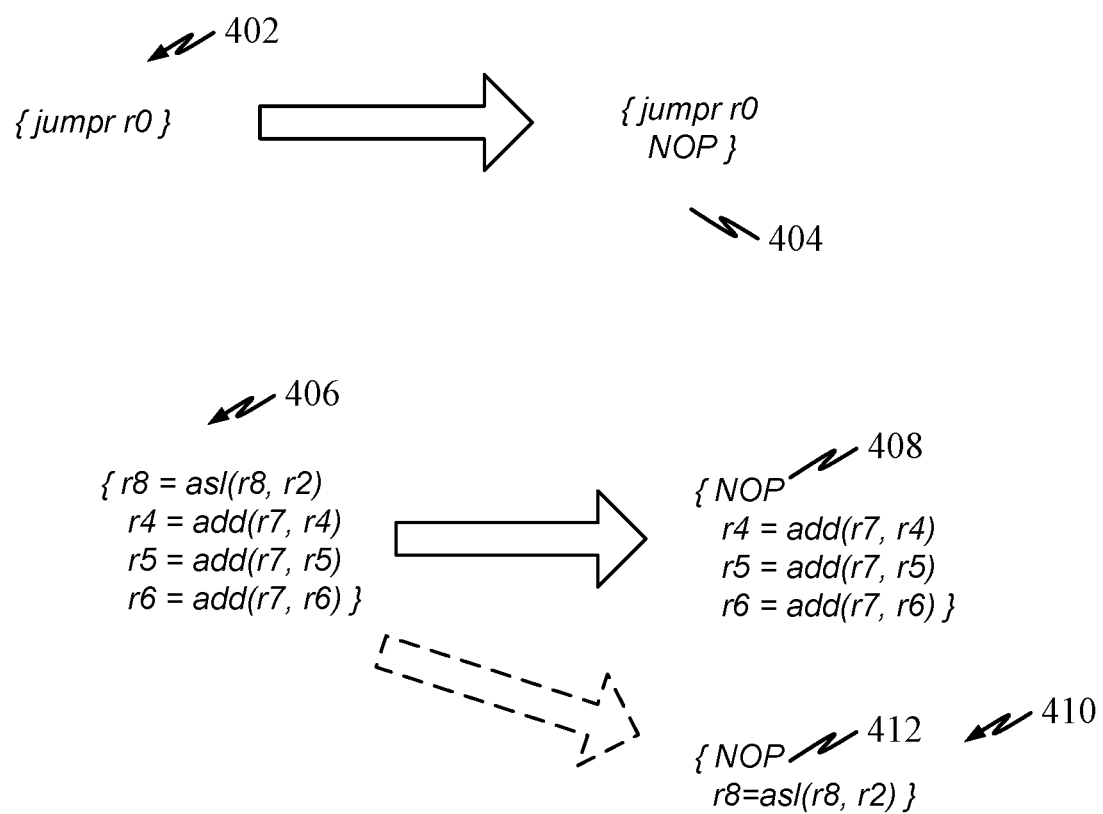
FIG. 4 is an illustration of modification of packets with a no operation instruction (NOP) according the present disclosure.

It is further noted that the placement of NOP instructions including the IDs into the packets could be accomplished at build time (i.e., build time being either compile or link time). FIG. 4 illustrates examples based on the previously discussed packets. Here, the ID for a control flow packet 402 indicating a jump is encoded with a NOP 404. FIG. 4 also illustrates a target packet 406, which includes four instructions. As discussed above, assuming a maximum packet length of 4 applies, the original packet could be split into two and then NOPs added to one or both packets to adjust the IDs. Thus, the target packet is split to a first packet containing 3 instructions and a NOP 408 to determine the target ID. It is further noted that for the target packets in this example the NOP is placed as the first instruction. Depending on the implementation, the position of the NOP instruction may or may not be taken into account by the function that computes the IDs. FIG. 4 also illustrates that the one of the four (4) instructions in packet 406 (e.g., r8=asl(r8,r2)) is split into one single instruction packet 410, and a NOP 412 may then be added to the packet.

It is also noted that, at build time, all the IDs are known as they can be computed for every relevant packet, and the assurance may be made that they match. Then, at run time, the combination function is applied to compute the IDs from the encoding of the instructions. It should be noted that the combination and verification functions are known both at build and run time and they might be the same or different for control-transfer packets and target packets.

Figure 5:
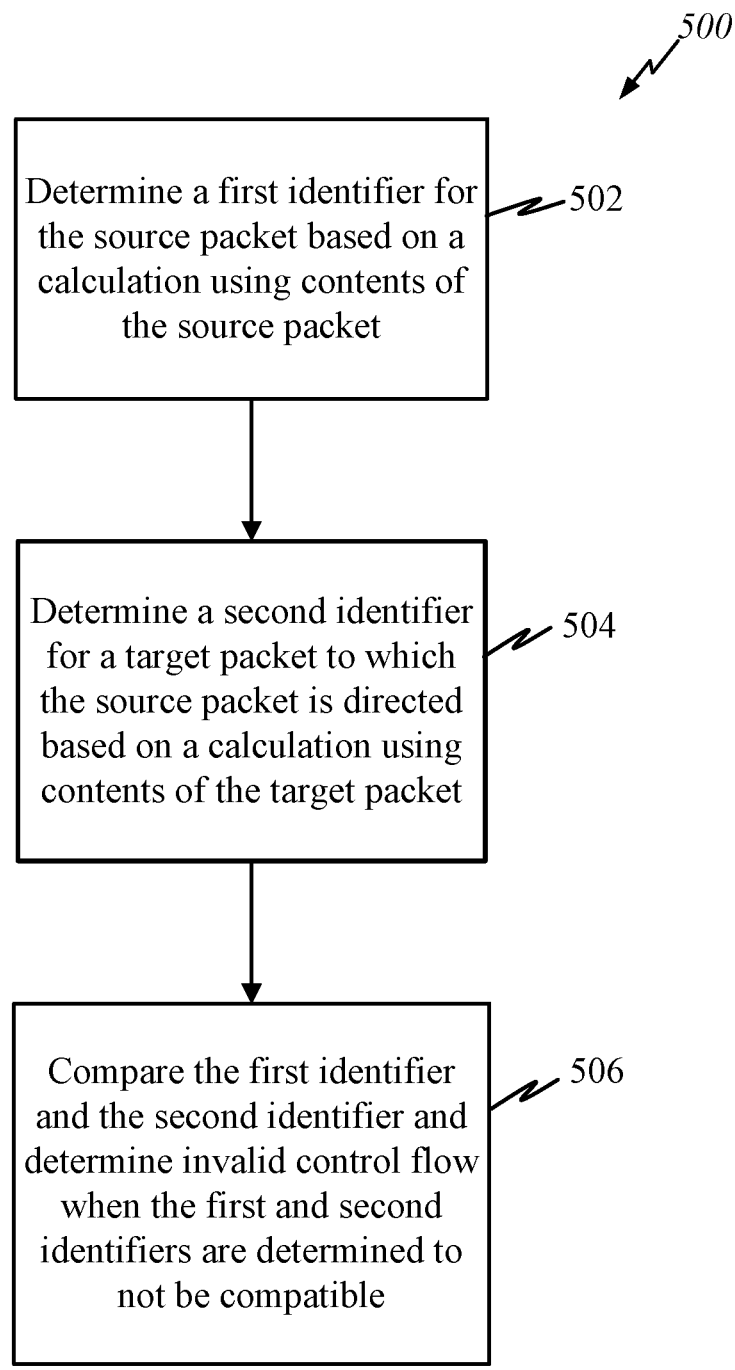
FIG. 5 illustrates another exemplary method for control flow validation according to the present disclosure.

FIG. 5 illustrates another example of a method 500 for control flow validation according to the present disclosure. The method 500 includes determining a first identifier (e.g., SID) for a source packet based on a calculation using at least a portion of the contents (e.g., instructions or bits) of the source packet as shown in block 502. The Source ID may be determined using the various methodologies described before, such as combing the bits of the instructions in the packet. In an aspect, the process of block 502 may be executed during a run time of a processing unit (e.g., unit 302) or other hardware. Additionally, it is noted that the first identifier is a value that was predetermined during compiling or build time, and thus, in a sense, inherent to the packet at this point. As discussed before, the predetermination of the first identifier may include setting a predetermined value, calculating a value based on combining the source packet contents, and/or determining the predetermined value by adjusting the contents of the source packet through an inserted NOP during compiling such that the first identifier will be determined or be resultant during runtime when the computation based on the source packet contents (e.g., combining bits from instructions in the packet) is performed. Further, it is noted that the process of block 502 may be implemented by a processing unit, such as unit 302, or by using other specific hardware.

Next, the method 500 includes determining a second identifier for a target packet (e.g., TID) to which the source packet is directed based on the contents or instructions within the target packet as indicated at block 504. This process 504 includes determining the second identifier (e.g., a target packet ID (TID)) based on a calculation using the contents of the target packet (e.g., at least a portion of the bits or instructions in the packet), where the calculation will yield the identifier, which has been previously predetermined at build or compiling time. The second identifier (e.g., the TID) may have been predetermined at build or compiling time using the various methodologies described before, such as combing the bits of the instructions in the packet or inserting a NOP configured such that the combination of bits or instructions in the packet will yield the desired ID when, at run time, the hardware will combine the bits of the packet for verification of a jump. In an aspect, the process of block 502 may be executed during a run time of a processing unit (e.g., unit 302) or other hardware. Additionally, it is noted that the first identifier is a value that previously predetermined during compiling or build time, and thus, in a sense, inherent to the packet at this point. Further, it is noted that the process of block 502 may be implemented by a processing unit, such as unit 302, or by using other specific hardware.

Finally, the method 500 includes comparing the first identifier and the second identifier and determining an invalid control flow when the first and second identifiers are determined to not be compatible as shown in block 506. This process in block 506 may include one of the verification functions discussed before, including determining compatibility through an exact match or through one identifier being determined to be a multiple of the other. In an aspect, the process of block 506 may be performed by a processing unit, such as unit 302, and verification function logic 308, in particular. When compatibility of the IDs is not found, then a run time exception is raised as this may indicate an attack. It is noted that method 500, may include the processing unit or other specific hardware determining that the processes of method 500 are to be performed or initiated when the processing unit encounters a jump instruction (e.g., an indirect jump).

In another aspect, it is noted that combination function/ID determination logic 308 may be configured dynamically such that a decision whether to use the combining function to compute an ID or simply assign a predefined ID can be made. Similarly, the verification function logic 310 may be configured to operate in a dynamic or mixed use manner. In such case, the verification could be accomplished by selectively choosing either matching the source and target IDs as equals or matching based on one ID being some multiple of the other ID in order to determine compatibility. In such case, some indication, such as a flag or bit(s) may be provided by the compiler so that during run time the processor will know whether to look for an exact match or a multiple (or some other characteristic or condition to determine compatibility between the IDs). It is also noted that the verification functions are not limited to exact match or multiple or division based matching, and that those skilled in the art will appreciate other functions could be used to determine the compatibility of source and target IDs.

Figure 6:
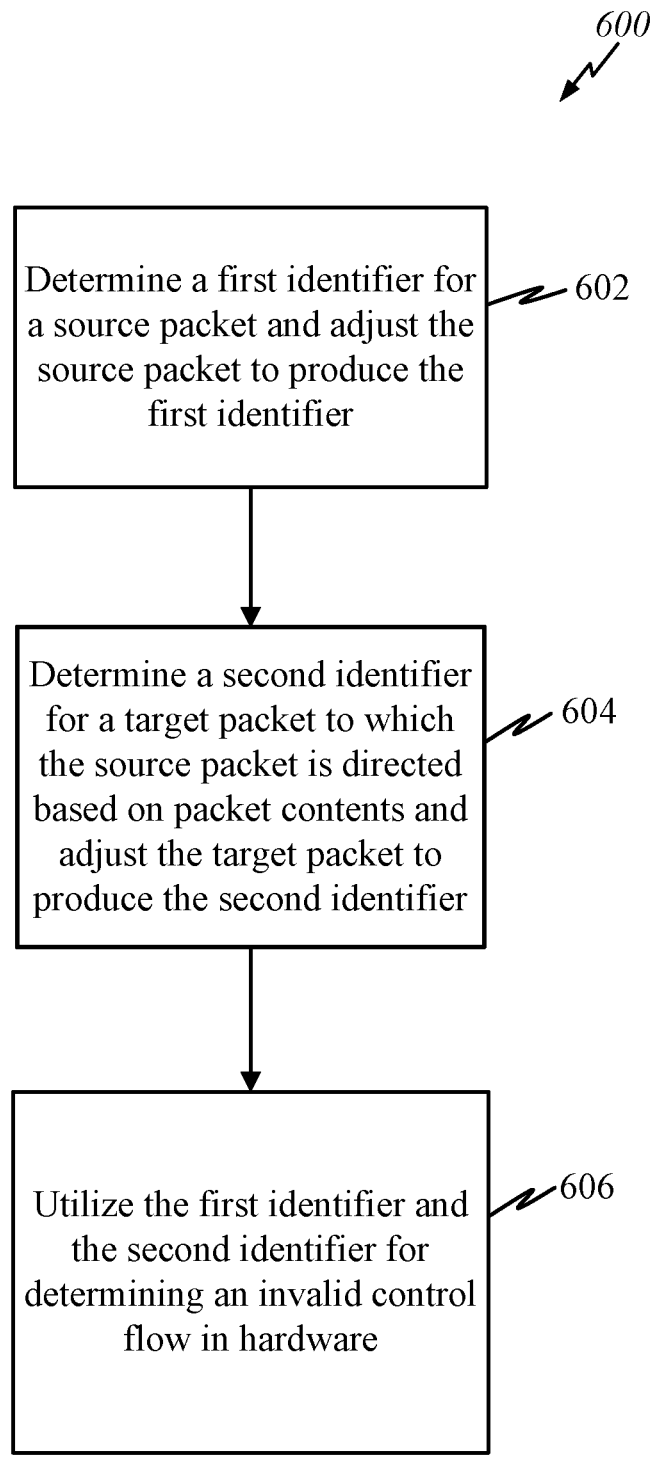
FIG. 6 illustrates an exemplary method for control flow validation including build time and compile time elements according to the present disclosure.

FIG. 6 illustrates an example of a method 600 for control flow validation that includes build or compile time elements, as well as run time elements, according to the present disclosure. The method 600, which is complementary to method 500, includes the identification of jump or call flow instructions (e.g., indirect jump or call flow instructions) in a packet, and determines or sets the identifiers for the source and target packets that will be used during run time to validate the control flow. Method 600 includes determining a first identifier for a source packet based on the contents or instructions in the source packet (e.g., an SID), as well as adjusting the source packet to produce the determined identifier as shown in block 602 of method 600. This process in block 602 may be performed at build time and includes determining the desired identifier for a source packet, such as SID, through either selecting a predetermined ID or already assigned ID, or combining bits from instructions in the packet using the combination function to compute the ID being particular to the packet based on its contents. In an aspect, the source packet may also be adjusted, if necessary, to ensure that the combination function produces a desired SID value. For example, the adjustment of the source packet may be effectuated through the use of the NOP instruction discussed above, which, when inserted into the packet, will ensure that when the bits of the packet are combined, the resultant value will be the desired ID value. It is noted that the process of block 602 could be performed by a compiler in software or by using specific hardware during compiling or build time.

Next, the method 600 includes determining a second identifier for a target packet to which the source packet is directed as indicated at block 604. The process of block 604 may also include adjusting the target packet, if necessary, to produce the desired identifier when the combination function is applied at run time by hardware. In a further aspect, this adjustment may include the use of a NOP instruction inserted in the target packet that is configured to ensure that when the bits are combined, the resultant combination will yield the desired ID. The process in block 604 may be performed at build time and includes determining the second identifier (e.g., the target packet ID) based on either a predetermined set ID or the SID (i.e., to make the SID and TID values compatible for purposes of validating the call flow) and the disclosed combination and verification functions. Also, the process of block 604 could be performed by a compiler in software, but could also be performed with specific hardware as well.

Finally, the method 600 includes a process as shown in block 606 of utilizing the first identifier and the second identifier for determining an invalid control flow when the first and second identifiers are determined to not be compatible during a run time operation. This process 606 may be performed at run time and may include one of the verification functions discussed before, including determining compatibility through an exact match of the two IDs or, through one identifier being a multiple of the other, as merely two examples. The process of block 606 could be performed by a processing unit, such as unit 302, and verification function logic 308, in particular. It is also noted that process of block 606 corresponds to method 500 shown in FIG. 5.

Of further note, the processes of blocks 602 and 604 may be predetermined or executed prior to the implementation at runtime of the processes of FIG. 5 or block 606. In an aspect, the predetermination of the first and second identifiers accomplished in blocks 602 and 604 may be built or complied into source code or instructions prior to their storage and/or implementation in a processor or a processor within a device, such as a mobile wireless device. Thus, in some aspects the predetermination of the identifiers may be considered as a priori information that allows a processor at runtime, for example, to validate the call flow as these identifiers are built into the source code delivered to a processor or device running the source code.

According to other aspects, it is noted that the first identifier is predetermined during compiling through at least one or more of setting a predetermined value based on the source packet contents and/or adjusting the contents of the source packet such that the first identifier in the source packet will be determined as the result of the computation based on the source packet contents during run time by the hardware. Similarly, the second identifier is predetermined during compiling such that is configured to be compatible with the first identifier through at least adjusting the contents of the target packet such that the second identifier in the target packet will be determined as a result of the computation based on the target packet contents during run time by the hardware.

In other aspects at least one of the first and second identifiers are configured in the form of a predefined instruction insertable in a packet during compiling and configured to not affect operation of a processing unit when placed within a packet, such as a NOP instruction. Additionally, the predefined instruction may be placed as a first instruction in a target packet, the placement of which may also signal to the hardware during run time that the packet is configured with an identifier to be used in comparing identifiers of source and target packets.

In another aspect, it is noted that packets are typically adjusted according to the disclosed methods and apparatus during compile or build time prior to run time by the hardware. Thus, the adjustments and NOP insertions would typically be performed at compile or build time. Notwithstanding, it is noted that in other aspects it may be contemplated by those skilled in the art that other means and timing could be envisioned to adjust packets to accomplished the disclosed control flow verification.

It is also noted that the presently disclosed addition of NOP instructions may increase memory usage and execution time. For example, in Hexagon each NOP instruction will add 4 bytes of memory. If the SID of source packets is used directly without adding any NOPs the per-jump memory cost is approximately 4 bytes (the NOP in the target packet, except for the those packets whose TID is compatible with the SID without any adjustments, which would in many cases be rare). Depending on the Combination Function, this may result in many packets having the same SID, which would produce unauthorized control transfers. If, instead, a NOP is added to every indirect control-transfer packet, complete control of the SIDs is gained, but the memory cost is approximately 8 bytes per indirect control-transfer, in the example of Hexagon.

Inserting NOP-only instructions into jump target packets to disambiguate the control transfer does create a tradeoff of memory for precision. As will be appreciated by those skilled in the art, however, the presently disclosed methods and apparatus provide a number of design choices that allow a compiler designer to reach any desired balance between memory usage and precision. It is also noted that using more complex Combining and Verification functions might yield better results in terms of number of unauthorized control transfers, but the increased complexity would make them slower. In light of the foregoing, those skilled in the art will appreciate that the present methods and apparatus may afford protection of both forward jumps (e.g., jumps or calls) and reverse paths (e.g., returns). Furthermore, the present methods and apparatus do not need to utilize in-memory tables or cryptography, thereby decreasing complexity. Also, the methodology is not affected by code relocations, and is simple to implement on both the compiler and hardware sides. In another aspect, the present methodology makes it possible to obtain full visibility of allowed control-transfers at compile time, analyze the potential for Return-oriented Programming (ROP) exploits, and reassign the IDs if necessary It is understood that the specific order or hierarchy of steps in the processes disclosed is merely an example of exemplary approaches. Based upon design preferences, it is understood that the specific order or hierarchy of steps in the processes may be rearranged while remaining within the scope of the present disclosure. The accompanying method claims present elements of the various steps in a sample order, and are not necessarily meant to be limited to the specific order or hierarchy presented if it is possible to change the order or hierarchy.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Those skilled in the art may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for control-flow validation comprising:
   determining, via a hardware processing circuit, a first identifier for a source packet based on a computation using contents of the source packet;
   determining, via the hardware processing circuit, a second identifier for a target packet to which the source packet is directed based on a computation using contents of the target packet, wherein at least one of the first and/or second identifiers are calculated by applying a combination function to bits of one or more instructions of the source packet or target packet where the combination function includes combining bits from the one or more instructions of the source packet or target packet, and wherein at least one of the first and/or second identifiers are configured as a predefined instruction inserted in a respective source packet and/or target packet, wherein the predefined instruction is configured to not affect operation of a processing unit executing the source packet and/or target packet; and
   comparing, via the hardware processing circuit, the first identifier and the second identifier and determining an invalid control flow when the first and second identifiers are determined from comparing to not be compatible.

2. The method of claim 1, wherein the first identifier is predetermined through at least one or more of setting a predetermined value based on the source packet contents and/or adjusting the contents of the source packet such that the first identifier will be determined as the result of the computation based on the source packet contents.

3. The method of claim 2, wherein the second identifier is predetermined to be compatible with the first identifier through at least adjusting the contents of the target packet such that the second identifier in the target packet will be determined as a result of the computation based on the target packet contents.

4. The method of claim 1, wherein the predefined instruction is placed as a first instruction in a target packet.

5. The method of claim 1, wherein the predefined instruction is a No Operation (NOP) instruction having a predefined number of bits according to an Instruction Set Architecture.

6. The method of claim 5, wherein the predefined number of bits correspond to one or more free bits within the NOP instruction.

7. The method of claim 5, where the comparison to determine compatibility of the first and second identifiers includes determining at least one of (1) if the first instruction in target packet is a NOP instruction and (2) if the first and second identifiers in the NOP instructions are compatible.

8. The method of claim 1, wherein compatibility may be determined through a predetermined verification function configured to determine the compatibility of the first and second identifiers.

9. The method of claim 1, further comprising:
   determining whether the source packet is one of a control-flow transfer packet or an indirect control-flow transfer packet; and
   determining the first identifier when the source packet is either a control-flow transfer packet or an indirect control-flow transfer packet.

10. The method of claim 1, further comprising:
    determining when a plurality of source packets call a given target packet;
    reading a new packet that has been inserted before the target packet that only contains a No Operation (NOP) instruction and force at least one of the plurality of source packets to use the new packet as its target.

11. An apparatus for control-flow validation comprising:
    means for determining a first identifier for a source packet based on a computation using contents of the source packet;
    means for determining a second identifier for a target packet to which the source packet is directed based on a computation using contents of the target packet, wherein at least one of the first and/or second identifiers are calculated by applying a combination function to bits of one or more instructions of the source packet or target packet where the combination function includes combining bits from the one or more instructions of the source packet or target packet, and wherein at least one of the first and/or second identifiers are configured as a predefined instruction inserted in a respective source packet and/or target packet, wherein the predefined instruction is configured to not affect operation of a processing unit executing the source packet and/or target packet; and
    means for comparing the first identifier and the second identifier and determining an invalid control flow when the first and second identifiers are determined by comparing to not be compatible.

12. The apparatus of claim 11, wherein the first identifier is predetermined through at least one or more of setting a predetermined value based on the source packet contents and/or adjusting the contents of the source packet such that the first identifier will be determined as the result of the computation based on the source packet contents.

13. The apparatus of claim 11, wherein the second identifier is predetermined to be compatible with the first identifier through at least adjusting the contents of the target packet such that the second identifier in the target packet will be determined as a result of the computation based on the target packet contents.

14. The apparatus of claim 11, wherein the predefined instruction is placed as a first instruction in a target packet.

15. The apparatus of claim 11, wherein the predefined instruction is a No Operation (NOP) instruction having a predetermined number of bits according to an Instruction Set Architecture.

16. The apparatus of claim 15, wherein the predefined number of bits corresponds to one or more free bits within the NOP instruction.

17. The apparatus of claim 15, where the means for comparing to determine compatibility of the first and second identifiers includes:
means for determining at least one of (1) if the first instruction in target packet is a NOP instruction and (2) if the first and second identifiers in the NOP instructions are compatible.

18. The apparatus of claim 11, wherein means for comparing to determined compatibility further comprises a predetermined verification function configured to determine the compatibility of the first and second identifiers.

19. The apparatus of claim 11, further comprising:
means for determining whether the source packet is one of a control-flow transfer packet or an indirect control-flow transfer packet; and
means for determining the first identifier when the source packet is either a control-flow transfer packet or an indirect control-flow transfer packet.

20. The apparatus of claim 11, further comprising:
means for determining when a plurality of source packets call a given target packet;
means for reading a new packet that has been inserted before the target packet that only contains a No Operation (NOP) instruction and force at least one of the plurality of source packets to use the new packet as its target.

21. An apparatus for control-flow validation comprising:
hardware processing circuitry configured for:
determining a first identifier for a source packet based on a computation using contents of the source packet;
determining a second identifier for a target packet to which the source packet is directed based on a computation using contents of the target packet, wherein at least one of the first and/or second identifiers are calculated by applying a combination function to bits of one or more instructions of the source packet or target packet where the combination function includes combining bits from the one or more instructions of the source packet or target packet, and wherein at least one of the first and/or second identifiers are configured as a predefined instruction inserted in a respective source packet and/or target packet, wherein the predefined instruction is configured to not affect operation of a processing unit executing the source packet and/or target packet; and
comparing the first identifier and the second identifier and determining an invalid control flow when the first and second identifiers are determined from comparing to not be compatible.

22. The apparatus of claim 21, wherein the first identifier is predetermined through at least one or more of setting a predetermined value based on the source packet contents and/or adjusting the contents of the source packet such that the first identifier will be determined as the result of the computation based on the source packet contents.

23. The apparatus of claim 21, wherein the second identifier is predetermined to be compatible with the first identifier through at least adjusting the contents of the target packet such that the second identifier in the target packet will be determined as a result of the computation based on the target packet contents.

24. The apparatus of claim 21, wherein the predefined instruction further comprises a predefined No Operation (NOP) instruction.

25. The apparatus of claim 24, wherein the predefined NOP instruction is placed as a first instruction in a target packet.

26. The apparatus of claim 24, where the hardware processing circuitry is further configured to perform comparison to determine compatibility of the first and second identifiers through determining at least one of (1) if the first instruction in target packet is a NOP instruction and (2) if the first and second identifiers in the NOP instructions are compatible.

27. The apparatus of claim 21, wherein compatibility may be determined through an exact match of the first and second identifiers or through a determination that one identifier is a multiple of the other identifier.

28. The apparatus of claim 21, the processing circuitry further configured for:
determining when a plurality of source packets call a given target packet;
reading a new packet that has been inserted before the target packet that only contains a No Operation (NOP) instruction and force at least one of the plurality of source packets to use the new packet as its target.

29. A non-transitory processor-readable storage medium having one or more instructions which, when executed by at least one processing circuit, cause the at least one processing circuit to:
determine a first identifier for a source packet based on a computation using contents of the source packet;
determine a second identifier for a target packet to which the source packet is directed based on a computation using contents of the target packet, wherein at least one of the first and/or second identifiers are calculated by applying a combination function to bits of one or more instructions of the source packet or target packet where the combination function includes combining bits from the one or more instructions of the source packet or target packet, and wherein at least one of the first and/or second identifiers are configured as a predefined instruction inserted in a respective source packet and/or target packet, wherein the predefined instruction is configured to not affect operation of a processing unit executing the source packet and/or target packet; and
compare the first identifier and the second identifier and determining an invalid control flow when the first and second identifiers are determined from comparing to not be compatible.

30. The processor-readable storage medium of claim 29, wherein the first identifier is predetermined through at least one or more of setting a predetermined value based on the source packet contents and/or adjusting the contents of the source packet such that the first identifier will be determined as the result of the computation based on the source packet contents.

31. The processor-readable storage medium of claim 29, wherein the second identifier is predetermined to be compatible with the first identifier through at least adjusting the contents of the target packet such that the second identifier in the target packet will be determined as a result of the computation based on the target packet contents.

32. The processor-readable storage medium of claim 29, wherein the predefined instruction is placed as a first instruction in a target packet.

33. The processor-readable storage medium of claim 29, wherein the predefined instruction is a No Operation (NOP) instruction having a predetermined number of bits according to an Instruction Set Architecture.

34. The processor-readable storage medium of claim 33, wherein the predefined number of bits correspond to one or more free bits within the NOP instruction.

35. The processor-readable storage medium of 33, where the comparison to determine compatibility of the first and second identifiers includes determining at least one of (1) if the first instruction in target packet is a NOP instruction and (2) if the first and second identifiers in the NOP instructions are compatible.

36. The processor-readable storage medium of claim 29, wherein compatibility may be determined through a predetermined verification function configured to determine the compatibility of the first and second identifiers.

37. The processor-readable storage medium of claim 29, the one or more instructions further causing the at least one processing circuit to:
 determine whether the source packet is one of a control-flow transfer packet or an indirect control-flow transfer packet; and
 determine the first identifier when the source packet is either a control-flow transfer packet or an indirect control-flow transfer packet.

38. The processor-readable storage medium of claim 29, the one or more instructions further causing the at least one processing circuit to:
 determine when a plurality of source packets call a given target packet;
 insert a new packet before the target that only contains a No Operation (NOP) instruction and force at least one of the plurality of source packets to use the new packet as its target.

* * * * *